United States Patent
Yang et al.

(10) Patent No.: US 12,309,448 B2
(45) Date of Patent: May 20, 2025

(54) LIVE BROADCAST MESSAGE DISPLAY METHOD AND APPARATUS

(71) Applicant: Beijing Bytedance Network Technology Co., Ltd., Beijing (CN)

(72) Inventors: Wu Yang, Beijing (CN); Qing Liu, Beijing (CN); Fengqiang Xu, Beijing (CN); Shucheng Yin, Beijing (CN)

( * ) Notice: Subject to any disclaimer, the term of this patent is extended or adjusted under 35 U.S.C. 154(b) by 0 days.

(21) Appl. No.: 18/002,640

(22) PCT Filed: May 20, 2021

(86) PCT No.: PCT/CN2021/094966
§ 371 (c)(1),
(2) Date: Dec. 20, 2022

(87) PCT Pub. No.: WO2021/258938
PCT Pub. Date: Dec. 30, 2021

(65) Prior Publication Data
US 2023/0247248 A1    Aug. 3, 2023

(30) Foreign Application Priority Data
Jun. 23, 2020  (CN) .......................... 202010579868.7

(51) Int. Cl.
*H04N 21/431*    (2011.01)
*H04N 21/2187*   (2011.01)
(Continued)

(52) U.S. Cl.
CPC ..... *H04N 21/4316* (2013.01); *H04N 21/2187* (2013.01); *H04N 21/437* (2013.01); *H04N 21/478* (2013.01)

(58) Field of Classification Search
CPC ........... H04N 21/4316; H04N 21/2187; H04N 21/437; H04N 21/478; H04N 21/41407;
(Continued)

(56) References Cited

U.S. PATENT DOCUMENTS 7,689,449 B1    3/2010  Mori et al.
10,642,473 B2 *  5/2020  Tseng .................. G06F 3/04855
(Continued)

FOREIGN PATENT DOCUMENTS

CN    105916057 A    8/2016
CN    106533916 A    3/2017
(Continued)

OTHER PUBLICATIONS

China National Intellectual Property Administration, Notice of Allowance issued in Chinese Application No. 202010579868.7, Oct. 17, 2022, 5 pages.
(Continued)

*Primary Examiner* — Adil Ocak
(74) *Attorney, Agent, or Firm* — Alleman Hall & Tuttle LLP (57) ABSTRACT

Provided are a live broadcast message display method and apparatus. The method comprises: when it is detected that a time interval between the current time and the time when a live broadcast message is last acquired is equal to a target message acquisition interval, sending a present message acquisition request to a server, and receiving live broadcast messages returned by the server and an updated target message acquisition interval; determining a message rolling rate according to the updated target message acquisition interval and the number of live broadcast messages returned by the server; and according to the determined message rolling rate, displaying the live broadcast messages in a rolling manner in a display area.

18 Claims, 5 Drawing Sheets

(51) Int. Cl.
*H04N 21/437* (2011.01)
*H04N 21/478* (2011.01)

(58) Field of Classification Search
CPC ........... H04N 21/4312; H04N 21/4788; H04N 21/2393; H04N 21/485
USPC ......................................................... 725/32
See application file for complete search history.

(56) References Cited

U.S. PATENT DOCUMENTS

| | | | |
|---|---|---|---|
| 2003/0055908 | A1 | 3/2003 | Brown et al. |
| 2010/0169472 | A1* | 7/2010 | Okamoto ............... H04L 67/02 709/224 |
| 2014/0047049 | A1 | 2/2014 | Poston et al. |
| 2017/0139565 | A1* | 5/2017 | Choi ..................... G06F 3/0483 |
| 2018/0192142 | A1 | 7/2018 | Paul |
| 2019/0394146 | A1* | 12/2019 | Wang ................... H04N 21/252 |
| 2022/0239969 | A1* | 7/2022 | Babu .................. H04N 21/4788 |

FOREIGN PATENT DOCUMENTS

| | | |
|---|---|---|
| CN | 108174267 A | 6/2018 |
| CN | 108391154 A | 8/2018 |
| CN | 108449606 A | 8/2018 |
| CN | 108965098 A | 12/2018 |
| CN | 109698960 A | 4/2019 |
| CN | 110933480 A | 3/2020 |
| CN | 111083508 A | 4/2020 |
| CN | 111314433 A | 6/2020 |
| CN | 111770351 A | 10/2020 |
| WO | 2020039241 A1 | 2/2020 |

OTHER PUBLICATIONS

China National Intellectual Property Administration, Office action issued in Chinese Application No. 202010579868.7, Sep. 26, 2021, 11 pages.
ISA China Patent Office, International Search Report issued in Application No. PCT/CN2021/094966, Jul. 29, 2021, WIPO, 8 pages.
International Preliminary Report on Patentability for International Application No. PCT/CN2021/094966, mailed Jan. 5, 2023, 13 pages.
Written Opinion for International Application No. PCT/CN2021/094966, mailed Jul. 29, 2021, 09 Pages.

* cited by examiner

LIVE BROADCAST MESSAGE DISPLAY METHOD AND APPARATUS

CROSS-REFERENCE TO RELATED APPLICATIONS

The present application is the national phase of International Application No. PCT/CN2021/094966, titled "LIVE BROADCAST MESSAGE DISPLAY METHOD AND APPARATUS", filed on May 20, 2021, which claims priority to Chinese Patent Application No. 202010579868.7, titled "LIVE BROADCAST MESSAGE DISPLAY METHOD AND APPARATUS", filed on Jun. 23, 2020, both of which are incorporated herein by reference in their entireties.

FIELD

The present disclosure relates to the field of internet technologies, and in particular, to a live message display method and apparatus.

BACKGROUND

With the popularity of smart devices, the live industry has developed rapidly, and more and more users broadcast in live rooms or view live broadcasts of anchors in live rooms. Since there is no limit to the quantity of users in the live room, users in the live room can enter and leave the live room at will, so the quantity of users and traffic in the live room may surge. For example, when the anchor of the live room is famous, the quantity of users in the live room may reach hundreds of thousands or even millions in a short period of time.

When the quantity of users in the live room is large, the quantity of messages in the live room is also large. Currently, the user terminal can obtain live messages from a server at preset intervals, and all the obtained live messages are displayed in the display area. However, when the quantity of messages in the live room is large, display of the live messages may get stuck.

SUMMARY

At least a live message display method and s live message display apparatus are provided according to the embodiments of the present disclosure.

In a first aspect, a live message display method is provided according to an embodiment of the present disclosure, including:
  based on detection that a time interval between a current time instant and a previous time instant when a live message is acquired last time is equal to a target message acquisition interval, sending a current message acquisition request to a server, and receiving a live message returned by the server and an updated target message acquisition interval;
  determining a message scrolling speed based on the updated target message acquisition interval and a quantity of the live message returned by the server; and
  performing scrolling display of the live message in a display area according to the determined message scrolling speed.

In an optional embodiment, the performing scrolling display of the live message in a display area according to the determined message scrolling speed includes:
  performing scrolling display of the live message in the display area according to the message scrolling speed in a case that the message scrolling speed is less than or equal to a set speed threshold.

In an optional embodiment, the performing scrolling display of the live message in a display area according to the determined message scrolling speed includes:
  determining a quantity of a to-be-displayed live message based on the speed threshold and the updated message acquisition interval in a case that the message scrolling speed is greater than the speed threshold; and
  determining the to-be-displayed live message from the live message returned by the server based on the determined quantity of the to-be-displayed live message, and performing scrolling display of the to-be-displayed live message in the display area.

In an optional embodiment, after the determining a quantity of a to-be-displayed live message, the method further includes:
  displaying a message expansion button corresponding to a live message among the live message returned by the server other than the to-be-displayed live message; and
  displaying the other live message in the display area on reception of a trigger operation for the message expansion button.

In an optional embodiment, the determining the to-be-displayed live message from the live message returned by the server based on the determined quantity of the to-be-displayed live message includes:
  determining a display quantity corresponding to each message type in the live message returned by the server based on a determined weight corresponding to the message type in the live message returned by the server and the quantity of the live message; and
  determining a to-be-displayed live message corresponding to each message type among the live message returned by the server based on the display quantity corresponding to the message type.

In an optional embodiment, the displaying a message expansion button includes:
  displaying a message expansion button corresponding to each message type in the other live message; and
  after the displaying a message expansion button, the method includes:
  displaying a live message corresponding to any message type among the other live message in the display area in response to a triggering operation for the message expansion button corresponding to the message type.

In a second aspect, a live message display method is provided according to an embodiment of the present disclosure, including:
  receiving a message acquisition request from a user terminal for a target live room;
  determining a to-be-pushed live message according to a time interval between a current time instant and a previous time instant when the user terminal acquires a live message last time; and determining, based on a current user quantity of the target live room, an updated target message acquisition interval corresponding to the user quantity; and
  sending the determined updated target message acquisition interval and the to-be-pushed live message to the user terminal.

In an optional embodiment, the determining a to-be-pushed live message according to a time interval between a current time instant and a previous time instant when the user terminal acquires a live message last time includes:

acquiring multiple live messages generated between the previous time instant when the user terminal acquires the live message last time and the current time instant;

selecting, among the multiple live messages, a live message corresponding to each message type based on a set weight corresponding to the message type, in a case that the quantity of the multiple live messages is greater than a set quantity threshold; and determining the selected live message corresponding to each message type as the to-be-pushed live message.

In a third aspect, a live message display apparatus is provided according to an embodiment of the present disclosure, including:

a first receiving module configured to, based on detection that a time interval between a current time instant and a previous time instant when a live message is acquired last time is equal to a target message acquisition interval, send a current message acquisition request to a server, and receive a live message returned by the server and a updated target message acquisition interval;

a first determining module configured to determine a message scrolling speed based on the updated target message acquisition interval and a quantity of the live message returned by the server; and a first display module configured to perform scrolling display of the live message in a display area according to the determined message scrolling speed.

In an optional embodiment, the first display module, when performing scrolling display of the live message in a display area according to the determined message scrolling speed, is configured to:

perform scrolling display of the live message in the display area according to the message scrolling speed in a case that the message scrolling speed is less than or equal to a set speed threshold.

In an optional embodiment, the first display module, when performing scrolling display of the live message in a display area according to the determined message scrolling speed, is configured to:

determine a quantity of a to-be-displayed live message based on the speed threshold and the updated message acquisition interval in a case that the message scrolling speed is greater than the speed threshold; and determine the to-be-displayed live message from the live message returned by the server based on the determined quantity of the to-be-displayed live message, and performing scrolling display of the to-be-displayed live message in the display area.

In an optional embodiment, after the determining a quantity of a to-be-displayed live message, the apparatus further includes:

a button display module, configured to display a message expansion button corresponding to a live message among the live message returned by the server other than the to-be-displayed live message; and a second display module, configured to display the other live message in the display area on reception of a trigger operation for the message expansion button.

In an optional embodiment, the first display module, when determining the to-be-displayed live message from the live message returned by the server based on the determined quantity of the to-be-displayed live message, is configured to:

determine a display quantity corresponding to each message type in the live message returned by the server based on a determined weight corresponding to the message type in the live message returned by the server and the quantity of the live message; and determine a to-be-displayed live message corresponding to each message type among the live message returned by the server based on the display quantity corresponding to the message type.

In an optional embodiment, the button display module, when displaying a message expansion button, is configured to:

display a message expansion button corresponding to each message type in the other live message; and after the displaying a message expansion button, the apparatus further includes:

a responding module, configured to display a live message corresponding to any message type among the other live message in the display area in response to a triggering operation for the message expansion button corresponding to the message type.

In a fourth aspect, a live message display apparatus is provided according to an embodiment of the present disclosure, including:

a second receiving module configured to receive a message acquisition request from a user terminal for a target live room;

a second determining module configured to determine a to-be-pushed live message according to a time interval between a current time instant and a previous time instant when the user terminal acquires a live message last time; and determine, based on a current user quantity of the target live room, a updated target message acquisition interval corresponding to the user quantity; and a sending module configured to send the determined updated target message acquisition interval and the to-be-pushed live message to the user terminal.

In an optional embodiment, the second determining module, when determining a to-be-pushed live message according to a time interval between a current time instant and a previous time instant when the user terminal acquires a live message last time, is configured to:

acquire multiple live messages generated between the previous time instant when the user terminal acquires the live message last time and the current time instant;

select, among the multiple live messages, a live message corresponding to each message type based on a set weight corresponding to the message type, in a case that the quantity of the multiple live messages is greater than a set quantity threshold; and determine the selected live message corresponding to each message type as the to-be-pushed live message.

In a fifth aspect, an electronic device is provided according to an embodiment of the present disclosure, including: a processor, a memory, and a bus. The memory stores machine-readable instructions executable by the processor. When the electronic device runs, the processor communicates with the memory via the bus, and the machine-readable instructions, when executed by the processor, performs steps in the first aspect or any one of the possible embodiments in the first aspect, or performs steps in the second aspect or any one of the possible embodiments in the second aspect.

In a sixth aspect, a computer-readable storage medium is provided according to an embodiment of the present disclosure. A computer program is stored on the computer-readable storage medium, and the computer program, when executed by a processor, performs steps in the first aspect or any one of the possible embodiments in the first aspect, or performs steps in the second aspect or any one of the possible embodiments in the second aspect.

A live message display method and a live message display apparatus are provided according to the embodiments of the present disclosure. When it is detected that the time interval between the current time instant and the previous time instant when the live message is acquired last time is equal to the target message acquisition interval, the current message acquisition request is sent to the server, and the live message returned by the server and the updated target message acquisition interval are received; the message scrolling speed is determined based on the updated target message acquisition interval and the quantity of the live message returned by the server; and the scrolling display of the live message is performed in the display area according to the determined message scrolling speed. By determining the message scrolling speed for the received live message, and displaying the live message in the display area according to the determined scrolling speed, the scrolling speed of the live message can be flexibly controlled, and the stuck phenomenon can be avoided. In addition, the user terminal may receive the updated target message acquisition interval, and determine a next time instant for acquiring the live message according to the updated target message acquisition interval, so as to adjust the frequency of acquiring live messages and improve the flexibility of displaying live messages.

In order to make the above objects, features and advantages of the present disclosure more obvious and easy to understand, the preferred embodiments are exemplified below, and are described in detail as follows in conjunction with the accompanying drawings.

BRIEF DESCRIPTION OF THE DRAWINGS

In order to explain the technical solutions of the embodiments of the present disclosure more clearly, the following briefly introduces the accompanying drawings required in the embodiments, which are incorporated into the specification and constitute a part of the specification. The drawings illustrate embodiments consistent with the present disclosure, and together with the description serve to explain the technical solutions of the present disclosure. It should be understood that the following drawings show only some embodiments of the present disclosure, and therefore should not be construed as limiting the scope. For those skilled in the art, other related drawings may be obtained according to these drawings without any creative work.

DESCRIPTION OF EMBODIMENTS

In order to make the purposes, technical solutions and advantages of the embodiments of the present disclosure more clear, the technical solutions in the embodiments of the present disclosure will be clearly and completely described below with reference to the accompanying drawings in the embodiments of the present disclosure. Obviously, the described embodiments are only some, but not all embodiments of the present disclosure. The components of the disclosed embodiments generally described and illustrated in the drawings herein may be arranged and designed in a variety of different configurations. Therefore, the following detailed description of the embodiments of the disclosure provided in the accompanying drawings is not intended to limit the scope of the disclosure as claimed, but is merely representative of selected embodiments of the disclosure. Based on the embodiments of the present disclosure, all other embodiments obtained by those skilled in the art without creative work fall within the protection scope of the present disclosure.

Generally, a user terminal corresponding to a live room may periodically acquires live messages in the live room from a server, and display the acquired live messages of the live room on a display area of the user terminal. Since the display area is limited, when there are few live messages, all the acquired live messages can be displayed in the display area. However, since the live messages are acquired and displayed periodically, display of live messages in a long period may get stuck, resulting in a poor display effect of the live messages. Therefore, in order to solve the above problems, a live message display method and a live message display apparatus are provided according to the present disclosure.

The defects existing in the above solutions are all the results acquired by the inventor after practice and careful research. Therefore, the discovery process of the above problems and the solutions to the above problems proposed by the present disclosure hereinafter should be contributions made by the inventors to the present disclosure.

It should be noted that similar numerals and letters refer to similar items in the following drawings, so once an item is defined in one drawing, it does not require further definition and explanation in subsequent drawings.

In order to facilitate the understanding of the embodiment, a live message display method according to an embodiment of the present disclosure is first introduced in detail. The execution subject of the live message display method according to the embodiments of the present disclosure is generally a computer device with a certain computing capability. The computer device includes, for example, a terminal device, a server, or another processing device. The terminal device may be user equipment (UE), a mobile device, a user terminal, a terminal, a cell phone, a cordless phone, a personal digital assistant (PDA), a handheld device, a computing device, an in-vehicle device, a wearable device, and the like. In some possible implementations, the live message display method may be implemented by a processor invoking computer-readable instructions stored in a memory.

To facilitate understanding of the embodiments of the present disclosure, a live message display method according to an embodiment of the present disclosure is first introduced in detail.

First Embodiment

Figure 1:
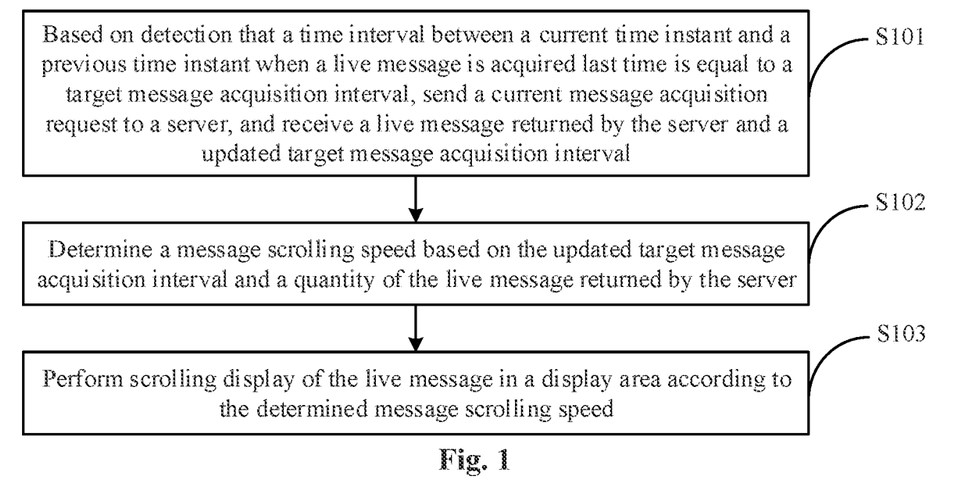
FIG. 1 shows a flowchart of a live message display method according to an embodiment of the present disclosure.

Reference is made to FIG. 1, which is a flowchart of a live message display method according to an embodiment of the present disclosure. The method is applied to a user terminal, and includes steps S101-S103.

In step S101, based on detection that a time interval between a current time instant and a previous time instant when a live message is acquired last time is equal to a target message acquisition interval, a current message acquisition request is sent to a server, and a live message returned by the server and a updated target message acquisition interval are received.

For example, a user terminal A in a live room A acquires a live message at 10:10:10 last time (the time instant is ten minutes and ten seconds past ten), and the target message acquisition interval received when the live message is acquired last time is 3 seconds, the current message acquisition request may be sent to the server at the current time instant 10:10:13, and the live message returned by the server and the updated target message acquisition interval may be received. The received live message includes live messages generated in the live room A during the time period from 10:10:10 (excluding 10:10:10) to 10:10:13 (including 10:10:13). If the updated target message acquisition interval is 5 seconds, the current message acquisition request may be sent to the server again at the current time instant 10:10:18, and the live message returned by the server and the updated target message acquisition interval may be received again. The live message received this time includes live messages generated in the live room A during the time period from 10:10:13 to 10:10:18.

The received live message may be all messages generated in the live room within the time period corresponding to the target message acquisition interval, or may be a selected part of multiple messages generated in the live room within the time period corresponding to the target message acquisition interval.

In step S102, a message scrolling speed is determined based on the updated target message acquisition interval and a quantity of the live message returned by the server.

The message scrolling speed of the live message corresponding to the current message acquisition request may be determined based on to the updated target message acquisition interval and the quantity of the received live message. For example, the quantity of the live messages may be divided by the updated target message acquisition interval to acquire the corresponding message scrolling speed.

For example, if the updated target message acquisition interval received by a user terminal A is 5 seconds, and the quantity of the received live message is 20, it is determined that the message scrolling speed is 5 messages per second, that is, 5 messages may be displayed in the display area every second. Alternatively, it may be determined that the message scrolling speed is 0.25 seconds per message, that is, each live message may be displayed in the display area for 0.25 seconds.

In step S103, scrolling display of the live message is performed in a display area according to the determined message scrolling speed.

After the message scrolling speed is determined, the scrolling display of the live message may be performed in the display area according to the determined message scrolling speed.

In the embodiment of the present disclosure, when it is detected that the time interval between the current time instant and the previous time instant when the live message is acquired last time is equal to the target message acquisition interval, the current message acquisition request is sent to the server, and the live message returned by the server and the updated target message acquisition interval are received; the message scrolling speed is determined based on the updated target message acquisition interval and the quantity of the live message returned by the server; and the scrolling display of the live message is performed in the display area according to the determined message scrolling speed. By determining the message scrolling speed for the received live message, and displaying the live message in the display area according to the determined scrolling speed, the scrolling speed of the live message can be flexibly controlled, and the stuck phenomenon can be avoided. In addition, the user terminal may receive the updated target message acquisition interval, and determine a next time instant for acquiring the live message according to the updated target message acquisition interval, so as to adjust the frequency of acquiring live messages and improve the flexibility of displaying live messages.

In an optional embodiment, the performing scrolling display of the live message in a display area according to the determined message scrolling speed includes:
    performing scrolling display of the live message in the display area according to the message scrolling speed in a case that the message scrolling speed is less than or equal to a set speed threshold.

Considering that when the user corresponding to the user terminal views the live message, if the message scrolling speed is too high, that is, if the message scrolling speed exceeds the user's recognition speed, the user cannot read the displayed live message when the live message scrolls, which brings inconvenience to the user viewing the live message and reduces the user experience. Therefore, the speed threshold may be determined according to a priori experience, that is, the fastest speed acceptable to the user may be determined as the speed threshold. The speed threshold may be set according to actual needs.

After the message scrolling speed is acquired, if the message scrolling speed is less than or equal to the set speed threshold, the scrolling display of the live message may be performed in the display area according to the message scrolling speed.

In an optional embodiment, the performing scrolling display of the live message in a display area according to the determined message scrolling speed includes:
    first, determining a quantity of a to-be-displayed live message based on the speed threshold and the updated message acquisition interval in a case that the message scrolling speed is greater than the speed threshold; and
    second, determining the to-be-displayed live message from the live message returned by the server based on the determined quantity of the to-be-displayed live message, and performing scrolling display of the to-be-displayed live message in the display area In a case that the message scrolling speed is greater than the set speed threshold, the quantity of the to-be-displayed live message may be determined based on the speed threshold and the updated message acquisition interval. For example, if the unit of the speed threshold is quantity of message/second, the speed threshold may be multiplied by the updated message acquisition interval to determine the quantity of the to-be-displayed live message. Alternatively, if the unit of the speed threshold is second/quantity of message, the updated message acquisition interval may be divided by the speed threshold to determine the quantity of the to-be-displayed live message. Alternatively, an updated message scrolling speed may be determined based on the speed threshold (for example, a speed less than the speed threshold may be selected as the message scrolling speed), and the quantity of the to-be-displayed live message may be determined based on the determined updated message scrolling speed and the updated message acquisition interval.

Then, a part of the received live message may be selected based on the determined quantity of the to-be-displayed live message (the quantity of the part of the live message may be equal to the determined quantity of the to-be-displayed live message), as the determined to-be-displayed live message. Then, scrolling display of the to-be-displayed live message may be performed in the display area based on the speed threshold or the determined updated message scrolling speed.

In an optional embodiment, the determining the to-be-displayed live message from the live message returned by the server based on the determined quantity of the to-be-displayed live message includes:

first, determining a display quantity corresponding to each message type in the live message returned by the server based on a determined weight corresponding to the message type in the live message returned by the server and the quantity of the live message; and second, determining a to-be-displayed live message corresponding to each message type among the live message returned by the server based on the display quantity corresponding to the message type.

The weight corresponding to each message type may be acquired from the server, or may be determined based on the quantity of message corresponding to each message type in the live message. For example, if the received live message include 20 like messages, 20 comment messages, and 10 reward messages, the weight corresponding to each message type in the live message may be determined as follows: the weight of the like message is 0.4, the weight of the comment message is 0.4, and the weight of the reward message is 0.2.

Further, if the determined quantity of the live message is 20, it may be determined that the display quantity corresponding to the like message is 8, the display quantity corresponding to the comment message is 8, and the display quantity corresponding to the reward message is 4, then 8 of the received 20 like messages may be selected as the to-be-displayed live message corresponding to the like message, 8 of the received 20 comment messages may be selected as the to-be-displayed live message corresponding to the comment message, and 4 of the received 10 reward messages may be selected as the to-be-displayed live message corresponding to the reward message.

In an implementation, the weight of each message type corresponding to the anchor in the live room may be different from the weight of each message type corresponding to the audience in the live room. For example, the weight of the comment message corresponding to the anchor in the live room may be set to be larger, and the weight of the reward message corresponding to the audience in the live room may be set to be larger. The weight corresponding to each message type may be set according to the actual situation, which is not limited here.

In an optional embodiment, after the determining a quantity of a to-be-displayed live message, the method further includes:

first, displaying a message expansion button corresponding to a live message among the live message returned by the server other than the to-be-displayed live message; and second, displaying the other live message in the display area on reception a trigger operation for the message expansion button.

In an embodiment of the present disclosure, a message expansion button corresponding to a live message in the live message returned by the server other than the to-be-displayed live message may further be displayed in the display area. The user corresponding to the user terminal may view the live message in the live message returned by the server other than the to-be-displayed live message in the display area by triggering the message expansion button. The message display button may be set as a button in any format, for example, the message display button may be a button including text and graphics.

For example, after the message expansion button is triggered, all other live messages may be displayed in the display area according to the generation time of the other live messages. Alternatively, after the message expansion button is triggered, a message expansion button corresponding to each message type may be displayed in the display area, so that the user can view the live message corresponding to each message type by triggering the message expansion button corresponding to the message type.

Figure 2:
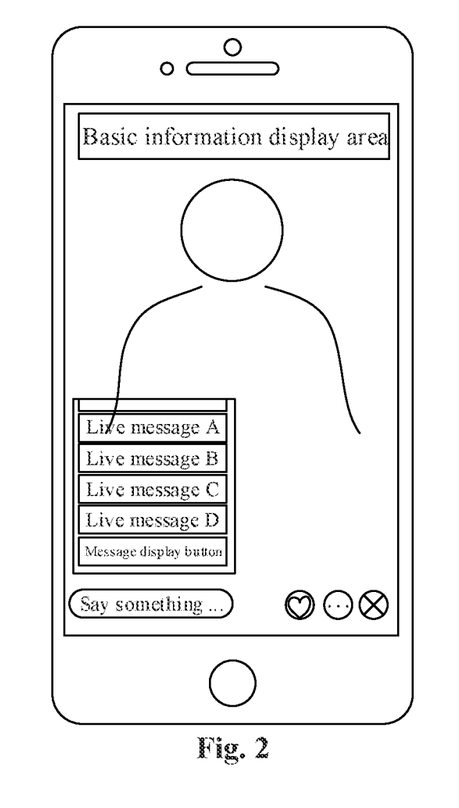
FIG. 2 shows a schematic diagram of an interface for displaying live messages in the live message display method according to an embodiment of the present disclosure.

Reference is made to FIG. 2, which is a schematic diagram of an interface for displaying a live message, where an anchor image display area, a basic information display area, a display area, and a function area are shown. The image of the anchor may be displayed in the anchor image display area. Basic information may be displayed in the basic information display area, and the basic information may include user names of viewers in the live room, the quantity of viewers in the live room, a name of the anchor, and the like. Acquired live messages may be displayed in the display area, such as live message A, live message B, live message C, live message D, and the like. Further, when there are a greater number of live messages, the message display button may further be displayed in the display area, so that a user may trigger the message display button to view other live messages that are not displayed in the live message. The function area includes a comment message generation button, a reward button, a more button, and a close button. For example, an area corresponding to "Say something . . . " in FIG. 2 may be triggered to generate a comment message, and the reward button may be triggered to reward the anchor (For example, the reward button may be a circle plus a heart-shaped logo as shown in FIG. 2), and the like.

In an optional embodiment, the displaying a message expansion button includes: displaying a message expansion button corresponding to each message type in the other live message.

Here, a message expansion button may be set for each message type. For example, a message expansion button may be set for the like message, a message expansion button may be set for the comment message, and the like. In an implementation, the message expansion buttons of various message type objects may be arranged at the bottom of the display area in sequence. Alternatively, the message expansion button corresponding to each message type may be arranged below the corresponding live message. For example, the message expansion button corresponding to the like message type may be arranged below the last like message displayed in the display area (the last like message may be the last like message in the live messages acquired this time).

Figure 3A:
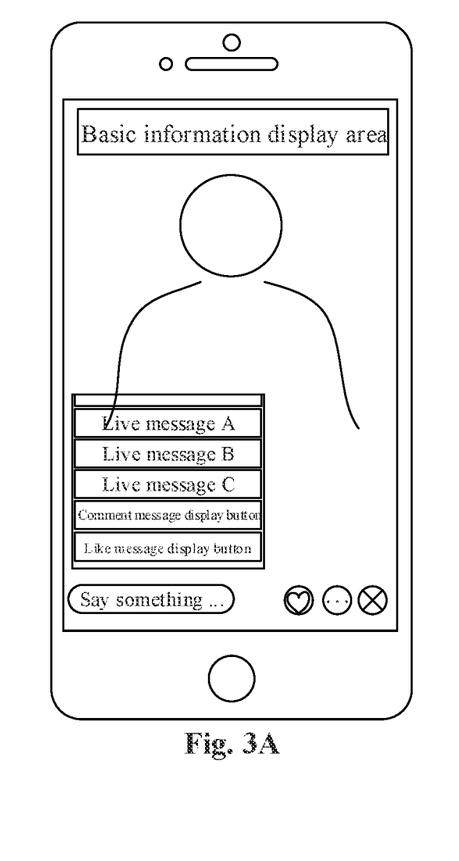
FIG. 3A shows a schematic diagram of an interface for displaying live messages in the live message display method according to an embodiment of the present disclosure.
Figure 3B:
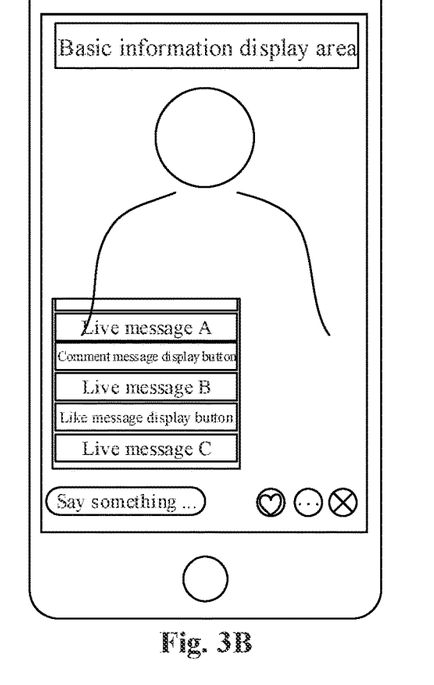
FIG. 3B shows a schematic diagram of an interface for displaying live messages in the live message display method according to an embodiment of the present disclosure.

Referring to FIG. 3A, the message expansion buttons of various message type objects are arranged at the bottom of the display area in sequence. As shown in FIG. 3A, the comment message display button and the like message display button are arranged at the bottom of the display area, and the comment message display button is arranged above the like message display button. Positions of the comment message display button and the like message display button may be set randomly, or may be determined according to generation of the last comment message and the last like message. For example, if the generation time of the last comment message in the live message acquired this time is earlier than the generation time of the last like message, the comment message display button is arranged above the like message display button. Referring to FIG. 3B, the message expansion button corresponding to each message type may be arranged below the corresponding live message. For example, the comment message display button may be arranged below the live message A (the live message A is the last live message in the live message acquired this time), and the like message display button is set below the live message B (the live message B is the last like message in the live message acquired this time).

In an optional embodiment, after the displaying a message expansion button, the method may include: displaying a live message corresponding to any message type among the other live message in the display area in response to a triggering operation for the message expansion button corresponding to the message type.

Here, the user may trigger the message expansion button corresponding to any message type, to display the live message corresponding to the message type among the other live message in the display area, and view the live message corresponding to the message type among the other live message.

Those skilled in the art can understand that in the method according to the above embodiments, the writing order of respective steps does not mean a strict execution order that constitutes any limitation on the implementation process, and the execution order of respective steps should be determined based on their function and possible internal logics.

Based on the same inventive concept, a live message display apparatus corresponding to the live message display method is further provided according to an embodiment of the present disclosure. Since the principle for solving the problem of the apparatus in the embodiment of the present disclosure is similar to the live message display method according to the above embodiments of the present disclosure, for the implementation of the apparatus, reference may be made to the implementation of the method, and the details will not be repeated Embodiment 2

Figure 4:
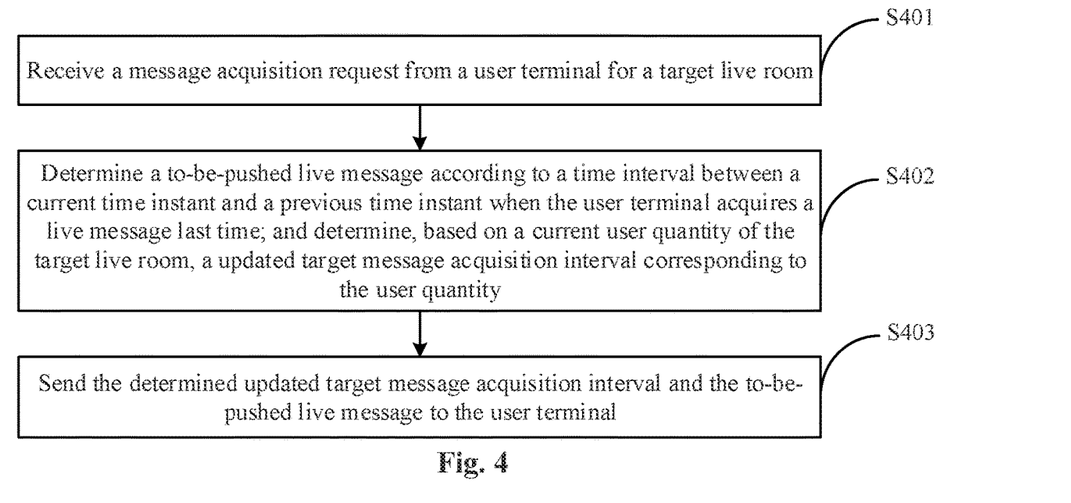
FIG. 4 shows a flowchart of a live message display method according to another embodiment of the present disclosure.

Reference is made to FIG. 4, which is a flowchart of a live message display method according to an embodiment of the present disclosure. The method is applied to a server, and includes the following steps S401-S403.

In step S401, a message acquisition request from a user terminal for a target live room is received.

In step S402, a to-be-pushed live message is determined according to a time interval between a current time instant and a previous time instant when the user terminal acquires a live message last time; and based on a current user quantity of the target live room, a updated target message acquisition interval corresponding to the user quantity is determined.

In step S403, the determined updated target message acquisition interval and the to-be-pushed live message are sent to the user terminal.

In an embodiment of the present disclosure, on reception of the message acquisition request sent by the user terminal for the target live room, the server determines the to-be-pushed live message according to the time interval between the current time instant at which the message acquisition request is received and the previous time instant when the user terminal acquires the live message last time. In addition, the updated target message acquisition interval corresponding to the current user quantity of the target live room may be determined based on the user quantity.

In an implementation, the updated target message acquisition interval corresponding to the user quantity may be determined based on the current user quantity of the target live room and a pre-stored mapping relationship between the user quantity and the message acquisition interval. For example, the pre-stored mapping relationship between the user quantity and the message acquisition interval may be: when the user quantity is 1-500, the message acquisition interval is 1 second; when the user quantity is 501-5000, the message acquisition interval is 3 seconds; when the user quantity is greater than 5000, the message acquisition interval is 5 seconds. Therefore, when the current user quantity of the target live room is 100, it may be determined that the updated target message acquisition interval corresponding to the user quantity is 1 second; when the current user quantity of the target live room is 1000, it may be determined that the updated target message acquisition interval corresponding to the user quantity is 3 seconds.

Then, the determined updated target message acquisition interval and the to-be-pushed live message may be sent to the user terminal.

In an optional embodiment, the determining a to-be-pushed live message according to a time interval between a current time instant and a previous time instant when the user terminal acquires a live message last time includes:
first, acquiring multiple live messages generated between the previous time instant when the user terminal acquires the live message last time and the current time instant;
second, selecting, among the multiple live messages, a live message corresponding to each message type based on a set weight corresponding to the message type, in a case that the quantity of the multiple live messages is greater than a set quantity threshold; and
third, determining the selected live message corresponding to each message type as the to-be-pushed live message.

In an embodiment of the present disclosure, if the quantity of the multiple live messages is less than or equal to the set quantity threshold, the multiple acquired live messages may be determined as the to-be-pushed live messages, and the determined to-be-pushed messages are sent to the corresponding user terminal.

If the quantity of the multiple live messages is greater than the set quantity threshold, the live message corresponding to each message type may selected from the multiple live messages based on the set weight corresponding to the message type, and the selected live message corresponding to each message type is determined as the to-be-pushed live message, and the determined to-be-pushed live message is sent to the corresponding user terminal.

The live message display method according to this embodiment of the present disclosure has the same technical features as the live message display method according to the above first embodiment, and therefore solves the same technical problem and achieve the same technical effect.

Those skilled in the art can understand that in the method according to the above embodiments, the writing order of respective steps does not mean a strict execution order that constitutes any limitation on the implementation process, and the execution order of respective steps should be determined based on their function and possible internal logics.

Based on the same inventive concept, a live message display apparatus corresponding to the live message display method is further provided according to an embodiment of the present disclosure. Since the principle for solving the problem of the apparatus in the embodiment of the present disclosure is similar to the live message display method according to the above embodiments of the present disclosure, for the implementation of the apparatus, reference may be made to the implementation of the method, and the details will not be repeated.

Embodiment 3

Figure 5:
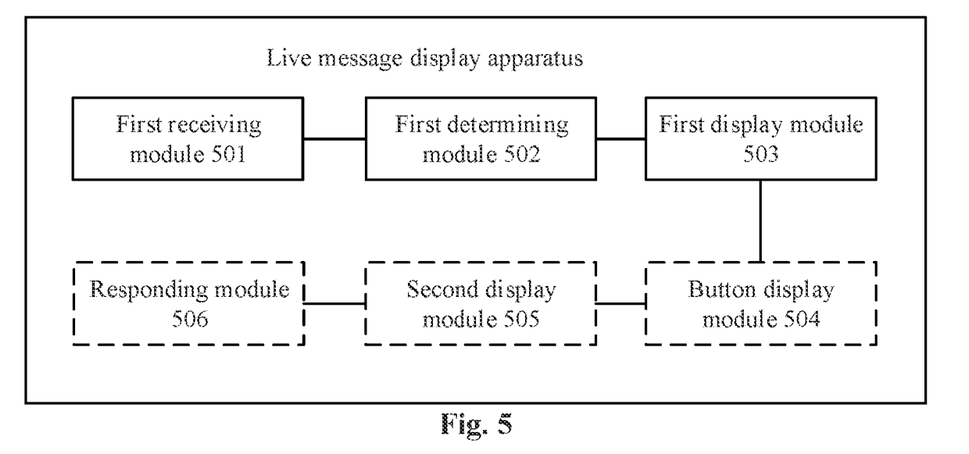
FIG. 5 shows a schematic diagram of a live message display apparatus according to an embodiment of the present disclosure.

Reference is made to FIG. 5, which is a schematic diagram of a live message display apparatus according to an embodiment of the present disclosure. The apparatus includes: a first receiving module 501, a first determining module 502, a first display module 503, a button display module 504, a second display module 505, and a responding module.

The first receiving module 501 is configured to, based on detection that a time interval between a current time instant and a previous time instant when a live message is acquired last time is equal to a target message acquisition interval, send a current message acquisition request to a server, and receive a live message returned by the server and a updated target message acquisition interval.

The first determining module 502 is configured to determine a message scrolling speed based on the updated target message acquisition interval and a quantity of the live message returned by the server; and The first display module 503 is configured to perform scrolling display of the live message in a display area according to the determined message scrolling speed.

In an optional embodiment, the first display module 503, when performing scrolling display of the live message in a display area according to the determined message scrolling speed, is configured to:
  perform scrolling display of the live message in the display area according to the message scrolling speed in a case that the message scrolling speed is less than or equal to a set speed threshold.

In an optional embodiment, the first display module 503, when performing scrolling display of the live message in a display area according to the determined message scrolling speed, is configured to:
  determine a quantity of a to-be-displayed live message based on the speed threshold and the updated message acquisition interval in a case that the message scrolling speed is greater than the speed threshold; and
  determine the to-be-displayed live message from the live message returned by the server based on the determined quantity of the to-be-displayed live message, and performing scrolling display of the to-be-displayed live message in the display area.

In an optional embodiment, after the determining a quantity of a to-be-displayed live message, the apparatus further includes:
  a button display module 504, configured to display a message expansion button corresponding to a live message among the live message returned by the server other than the to-be-displayed live message; and
  a second display module 505, configured to display the other live message in the display area on reception of a trigger operation for the message expansion button.

In an optional embodiment, the first display module 503, when determining the to-be-displayed live message from the live message returned by the server based on the determined quantity of the to-be-displayed live message, is configured to:
  determine a display quantity corresponding to each message type in the live message returned by the server based on a determined weight corresponding to the message type in the live message returned by the server and the quantity of the live message; and
  determine a to-be-displayed live message corresponding to each message type among the live message returned by the server based on the display quantity corresponding to the message type.

In an optional embodiment, the button display module 504, when displaying a message expansion button, is configured to:
  display a message expansion button corresponding to each message type in the other live message; and
  after the displaying a message expansion button, the apparatus further includes:
  a responding module 506, configured to display a live message corresponding to any message type among the other live message in the display area in response to a triggering operation for the message expansion button corresponding to the message type.

For the description of the processing flow of modules in the apparatus and the interaction flow between the modules, reference may be made to the relevant descriptions in the foregoing method embodiments, which will not be described in detail here.

Embodiment 4

Figure 6:
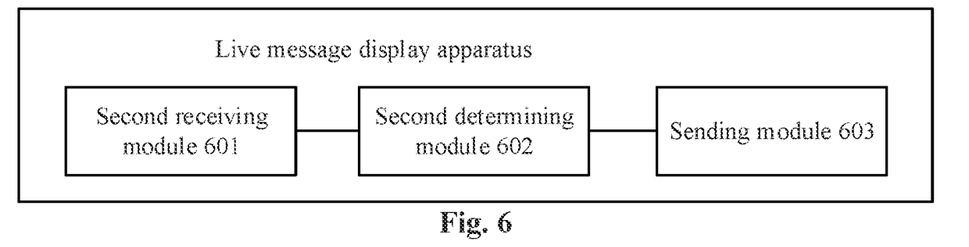
FIG. 6 shows a schematic diagram of a live message display apparatus according to another embodiment of the present disclosure.

Reference is made to FIG. 6, which is a schematic diagram of a live message display apparatus according to an embodiment of the present disclosure. The apparatus includes: a second receiving module 601, a second determining module 602, and a sending module 603.

The second receiving module 601 is configured to receive a message acquisition request from a user terminal for a target live room.

The second determining module 602 is configured to determine a to-be-pushed live message according to a time interval between a current time instant and a previous time instant when the user terminal acquires a live message last time; and determine, based on a current user quantity of the target live room, a updated target message acquisition interval corresponding to the user quantity.

The sending module 603 is configured to send the determined updated target message acquisition interval and the to-be-pushed live message to the user terminal.

In an optional embodiment, the second determining module 602, when determining a to-be-pushed live message according to a time interval between a current time instant and a previous time instant when the user terminal acquires a live message last time, is configured to:
  acquire multiple live messages generated between the previous time instant when the user terminal acquires the live message last time and the current time instant;
  select, among the multiple live messages, a live message corresponding to each message type based on a set weight corresponding to the message type, in a case that the quantity of the multiple live messages is greater than a set quantity threshold; and
  determine the selected live message corresponding to each message type as the to-be-pushed live message.

For the description of the processing flow of modules in the apparatus and the interaction flow between the modules, reference may be made to the relevant descriptions in the foregoing method embodiments, which will not be described in detail here.

Figure 7:
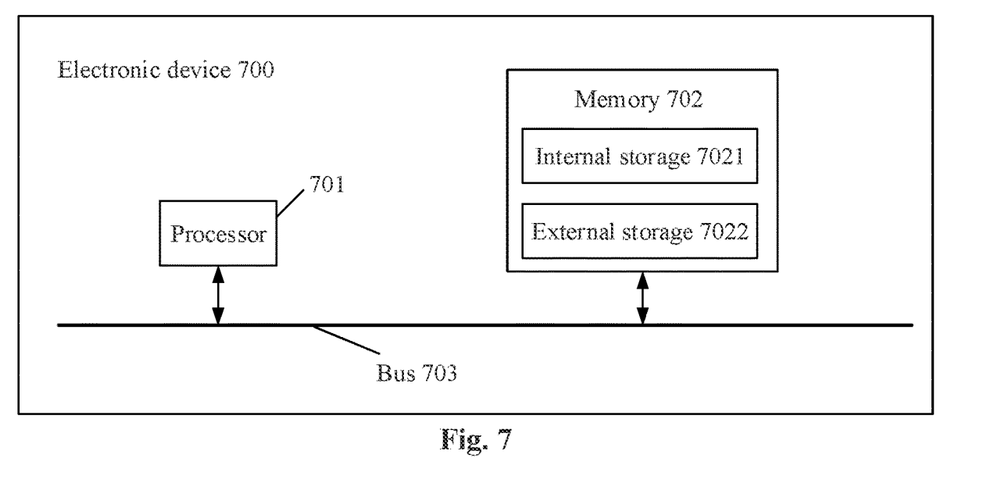
FIG. 7 shows a schematic diagram of an electronic device 700 according to an embodiment of the present disclosure.

Based on the same technical concept, an electronic device is further provided according to an embodiment of the present disclosure. Reference is made to FIG. 7, which is a schematic structural diagram of an electronic device 700 according to an embodiment of the present disclosure. The electronic device 700 includes a processor 701, a memory 702, and a bus 703. The memory 702 is configured to store execution instructions, and includes an internal storage 7021 and an external storage 7022. The internal storage 7021 here is also referred to as an internal memory, and is configured to temporarily store operation data in the processor 701 and data exchanged with the external storage 7022 such as a hard disk. The processor 701 exchanges data with the external storage 7022 through the internal storage 7021. When the electronic device 700 runs, the processor 701 communicates with the memory 702 through the bus 703, so that the processor 701 executes the following instructions:
  based on detection that a time interval between a current time instant and a previous time instant when a live message is acquired last time is equal to a target message acquisition interval, sending a current message acquisition request to a server, and receiving a live message returned by the server and an updated target message acquisition interval;
  determining a message scrolling speed based on the updated target message acquisition interval and a quantity of the live message returned by the server; and
  performing scrolling display of the live message in a display area according to the determined message scrolling speed.

In a possible embodiment, in the instructions executed by the processor 701, the performing scrolling display of the live message in a display area according to the determined message scrolling speed includes:
  performing scrolling display of the live message in the display area according to the message scrolling speed in a case that the message scrolling speed is less than or equal to a set speed threshold.

In a possible embodiment, in the instructions executed by the processor 701, the performing scrolling display of the live message in a display area according to the determined message scrolling speed includes:
  determining a quantity of a to-be-displayed live message based on the speed threshold and the updated message acquisition interval in a case that the message scrolling speed is greater than the speed threshold; and
  determining the to-be-displayed live message from the live message returned by the server based on the determined quantity of the to-be-displayed live message, and performing scrolling display of the to-be-displayed live message in the display area.

In a possible embodiment, in the instructions executed by the processor 701, after the determining a quantity of a to-be-displayed live message, the method further includes:
  displaying a message expansion button corresponding to a live message among the live message returned by the server other than the to-be-displayed live message; and
  displaying the other live message in the display area on reception of a trigger operation for the message expansion button.

In a possible embodiment, in the instructions executed by the processor 701, the determining the to-be-displayed live message from the live message returned by the server based on the determined quantity of the to-be-displayed live message includes:
  determining a display quantity corresponding to each message type in the live message returned by the server based on a determined weight corresponding to the message type in the live message returned by the server and the quantity of the live message; and
  determining a to-be-displayed live message corresponding to each message type among the live message returned by the server based on the display quantity corresponding to the message type.

In a possible embodiment, in the instructions executed by the processor 701, the displaying a message expansion button includes:
  displaying a message expansion button corresponding to each message type in the other live message; and
  after the displaying a message expansion button, the method includes:
  displaying a live message corresponding to any message type among the other live message in the display area in response to a triggering operation for the message expansion button corresponding to the message type.

Figure 8:
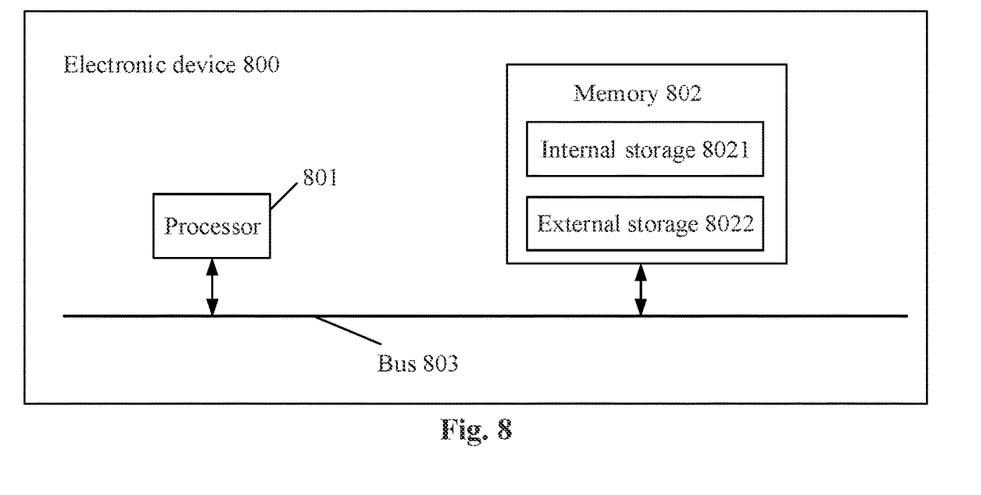
FIG. 8 shows a schematic diagram of an electronic device 800 according to an embodiment of the present disclosure.

Based on the same technical concept, an electronic device is further provided according to an embodiment of the present disclosure. Reference is made to FIG. 8, which is a schematic structural diagram of an electronic device 800 according to an embodiment of the present disclosure. The electronic device 800 includes a processor 801, a memory 802, and a bus 803. The memory 802 is configured to store execution instructions, and includes an internal storage 8021 and an external storage 8022. The internal storage 8021 here is also referred to as an internal memory, and is configured to temporarily store operation data in the processor 801 and data exchanged with the external storage 8022 such as a hard disk. The processor 801 exchanges data with the external storage 8022 through the internal storage 8021. When the electronic device 800 runs, the processor 801 communicates with the memory 802 through the bus 803, so that the processor 801 executes the following instructions:
  receiving a message acquisition request from a user terminal for a target live room;
  determining a to-be-pushed live message according to a time interval between a current time instant and a previous time instant when the user terminal acquires a live message last time; and determining, based on a current user quantity of the target live room, an updated target message acquisition interval corresponding to the user quantity; and
  sending the determined updated target message acquisition interval and the to-be-pushed live message to the user terminal.

In a possible embodiment, in the instructions executed by the processor 801, the determining a to-be-pushed live message according to a time interval between a current time instant and a previous time instant when the user terminal acquires a live message last time includes:

acquiring multiple live messages generated between the previous time instant when the user terminal acquires the live message last time and the current time instant;

selecting, among the multiple live messages, a live message corresponding to each message type based on a set weight corresponding to the message type, in a case that the quantity of the multiple live messages is greater than a set quantity threshold; and determining the selected live message corresponding to each message type as the to-be-pushed live message.

A computer-readable storage medium is provided according to an embodiment of the present disclosure, where a computer program is stored on the computer-readable storage medium, and the computer program, when executed by a processor, performs steps of the live message display method described in the above method embodiments. The storage medium may be a volatile or non-volatile computer-readable storage medium.

The computer program product of the live message display method according to an embodiment of the present disclosure includes a computer-readable storage medium storing program codes, and the instructions included in the program codes may be used to execute steps of the live message display method described in the above method embodiments. For details, reference may be made to the above method embodiments, which will not be repeated here.

A computer program is further provided according to an embodiment of the present disclosure, which, when executed by a processor, implements the method in any one of the foregoing embodiments. The computer program product may be implemented by hardware, software or a combination thereof. In an optional embodiment, the computer program product is embodied as a computer storage medium, and in another optional embodiment, the computer program product is embodied as a software product, such as a software development kit (SDK), and the like.

Those skilled in the art can clearly understand that, for the convenience and brevity of description, for the specific working process of the system and apparatus described above, reference may be made to the corresponding process in the foregoing method embodiments, which will not be repeated here. In the several embodiments provided by the present disclosure, it should be understood that the disclosed system, apparatus and method may be implemented in other manners. The apparatus embodiments described above are only illustrative. For example, the division of the units is only a logical function division. In actual implementation, there may be other division methods. For example, multiple units or components may be combined or may be integrated into another system, or some features may be ignored, or not implemented. On the other hand, the shown or discussed mutual coupling or direct coupling or communication connection may be indirect coupling or communication connection through some communication interfaces, devices or units, which may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in the embodiments.

In addition, functional units in each embodiment of the present disclosure may be integrated into one processing unit, or may exist as separate physical units, or two or more units may be integrated into one unit.

The functions, if implemented in the form of software functional units and sold or used as stand-alone products, may be stored in a processor-executable non-volatile computer-readable storage medium. Based on such understanding, the technical solutions of the present disclosure in essence, or the parts that contribute to the prior art or the parts of the technical solutions may be embodied in the form of software products. The computer software products are stored in a storage medium, including several instructions used to cause a computer device (which may be a personal computer, a server, or a network device, and the like) to execute all or part of the steps of the methods described in various embodiments of the present disclosure. The aforementioned storage medium includes: U disk, mobile hard disk, read-only memory (ROM), random access memory (RAM), magnetic disk or optical disk and other media that can store program codes.

Finally, it should be noted that the above-mentioned embodiments are only specific implementations of the present disclosure, and are used to illustrate rather than limiting the technical solutions of the present disclosure, and the protection scope of the present disclosure is not limited thereto. Although the present disclosure is described in detail with reference to the foregoing embodiments, those of ordinary skill in the art should understand that: any person skilled in the art can still modify or readily conceive changes to the technical solutions recorded in the foregoing embodiments, or make equivalent substitutions to some of the technical features thereof within the scope of the technology disclosed in the present disclosure; and these modifications, changes or substitutions do not make the essence of the corresponding technical solutions out of the spirit and scope of the technical solutions of the embodiments of the present disclosure, and shall be covered by the protection scope of the present disclosure. Therefore, the scope of protection of the present application should consist with the scope of protection of the claims.

What is claimed is:

1. A live message display method, comprising:

acquiring a target message acquisition interval returned by a server;

based on detection that a time interval between a current time instant and a previous time instant when a live message is acquired last time is equal to the target message acquisition interval, sending a current message acquisition request to the server, and receiving a live message returned by the server and an updated target message acquisition interval, wherein the larger a current user quantity of a target live room is, the larger the updated target message acquisition interval is;

determining a message scrolling speed based on the updated target message acquisition interval and a quantity of the live message returned by the server; and performing scrolling display of the live message in a display area on a live interface of the target live room according to the determined message scrolling speed.

2. The method according to claim 1, wherein the performing scrolling display of the live message in a display area according to the determined message scrolling speed comprises:

performing scrolling display of the live message in the display area according to the message scrolling speed in a case that the message scrolling speed is less than or equal to a set speed threshold.

3. The method according to claim 2, wherein the performing scrolling display of the live message in a display area according to the determined message scrolling speed comprises:
determining a quantity of a to-be-displayed live message based on the speed threshold and the updated message acquisition interval in a case that the message scrolling speed is greater than the speed threshold; and
determining the to-be-displayed live message from the live message returned by the server based on the determined quantity of the to-be-displayed live message, and performing scrolling display of the to-be-displayed live message in the display area.

4. The method according to claim 1, wherein the performing scrolling display of the live message in a display area according to the determined message scrolling speed comprises:
determining a quantity of a to-be-displayed live message based on the speed threshold and the updated message acquisition interval in a case that the message scrolling speed is greater than the speed threshold; and
determining the to-be-displayed live message from the live message returned by the server based on the determined quantity of the to-be-displayed live message, and performing scrolling display of the to-be-displayed live message in the display area.

5. The method according to claim 4, wherein after the determining a quantity of a to-be-displayed live message, the method further comprises:
displaying a message expansion button corresponding to a live message among the live message returned by the server other than the to-be-displayed live message; and
displaying the other live message in the display area on reception of a trigger operation for the message expansion button.

6. The method according to claim 4, wherein the determining the to-be-displayed live message from the live message returned by the server based on the determined quantity of the to-be-displayed live message comprises:
determining a display quantity corresponding to each message type in the live message returned by the server based on a determined weight corresponding to the message type in the live message returned by the server and the quantity of the live message; and
determining a to-be-displayed live message corresponding to each message type among the live message returned by the server based on the display quantity corresponding to the message type.

7. The method according to claim 6, wherein the displaying a message expansion button comprises:
displaying a message expansion button corresponding to each message type in the other live message; and
after the displaying a message expansion button, the method comprises:
displaying a live message corresponding to any message type among the other live message in the display area in response to a triggering operation for the message expansion button corresponding to the message type.

8. A live message display method, comprising:
receiving a message acquisition request from a user terminal for a target live room, the message acquisition request being used for acquiring live messages;
determining a to-be-pushed live message according to a time interval between a current time instant and a previous time instant when the user terminal acquires a live message last time; and determining, based on a current user quantity of the target live room, an updated target message acquisition interval corresponding to the user quantity, wherein the larger the current user quantity of the target live room is, the larger the updated target message acquisition interval is; and
sending the determined updated target message acquisition interval and the to-be-pushed live message to the user terminal, wherein the user terminal displays a live interface of the target live room, and the live messages are displayed on the live interface.

9. The method according to claim 8, wherein the determining a to-be-pushed live message according to a time interval between a current time instant and a previous time instant when the user terminal acquires a live message last time comprises:
acquiring a plurality of live messages generated between the previous time instant when the user terminal acquires the live message last time and the current time instant;
selecting, among the plurality of live messages, a live message corresponding to each message type based on a set weight corresponding to the message type, in a case that the quantity of the plurality of live messages is greater than a set quantity threshold; and
determining the selected live message corresponding to each message type as the to-be-pushed live message.

10. A live message display apparatus, comprising:
at least one processor; and
at least one memory communicatively coupled to the at least one processor and storing instructions that upon execution by the at least one processor cause the apparatus to:
acquire a target message acquisition interval returned by a server;
based on detection that a time interval between a current time instant and a previous time instant when a live message is acquired last time is equal to the target message acquisition interval, send a current message acquisition request to the server, and receive a live message returned by the server and an updated target message acquisition interval, wherein the larger a current user quantity of a target live room is, the larger the updated target message acquisition interval is;
determine a message scrolling speed based on the updated target message acquisition interval and a quantity of the live message returned by the server; and
perform scrolling display of the live message in a display area on a live interface of the target live room according to the determined message scrolling speed.

11. The apparatus of claim 10, the at least one memory further storing instructions that upon execution by the at least one processor cause the apparatus to:
perform scrolling display of the live message in the display area according to the message scrolling speed in a case that the message scrolling speed is less than or equal to a set speed threshold.

12. The apparatus of claim 10, the at least one memory further storing instructions that upon execution by the at least one processor cause the apparatus to:
determine a quantity of a to-be-displayed live message based on the speed threshold and the updated message acquisition interval in a case that the message scrolling speed is greater than the speed threshold; and determine the to-be-displayed live message from the live message returned by the server based on the determined quantity of the to-be-displayed live message, and performing scrolling display of the to-be-displayed live message in the display area.

13. The apparatus of claim 12, the at least one memory further storing instructions that upon execution by the at least one processor cause the apparatus to:
   display a message expansion button corresponding to a live message among the live message returned by the server other than the to-be-displayed live message; and
   display the other live message in the display area on reception of a trigger operation for the message expansion button.

14. The apparatus of claim 12, the at least one memory further storing instructions that upon execution by the at least one processor cause the apparatus to:
   determine a display quantity corresponding to each message type in the live message returned by the server based on a determined weight corresponding to the message type in the live message returned by the server and the quantity of the live message; and
   determine a to-be-displayed live message corresponding to each message type among the live message returned by the server based on the display quantity corresponding to the message type.

15. The apparatus of claim 14, the at least one memory further storing instructions that upon execution by the at least one processor cause the apparatus to:
   display a message expansion button corresponding to each message type in the other live message; and
   after the displaying a message expansion button, the at least one memory further storing instructions that upon execution by the at least one processor cause the apparatus to:
      display a live message corresponding to any message type among the other live message in the display area in response to a triggering operation for the message expansion button corresponding to the message type.

16. A live message display apparatus, comprising:
   at least one processor; and
   at least one memory communicatively coupled to the at least one processor and storing instructions that upon execution by the at least one processor cause the apparatus to: performs steps of the live message display method according to claim 8.

17. A computer-readable non-transitory storage medium, wherein a computer program is stored on the computer-readable storage medium, and the computer program, when executed by a processor, performs steps of the live message display method according to claim 1.

18. A computer-readable non-transitory storage medium, wherein a computer program is stored on the computer-readable storage medium, and the computer program, when executed by a processor, performs steps of the live message display method according to claim 8.

* * * * *